Aug. 13, 1929.  H. A. HICKS  1,724,482
AIRPLANE LANDING LIGHT
Filed Oct. 7, 1927  2 Sheets-Sheet 1
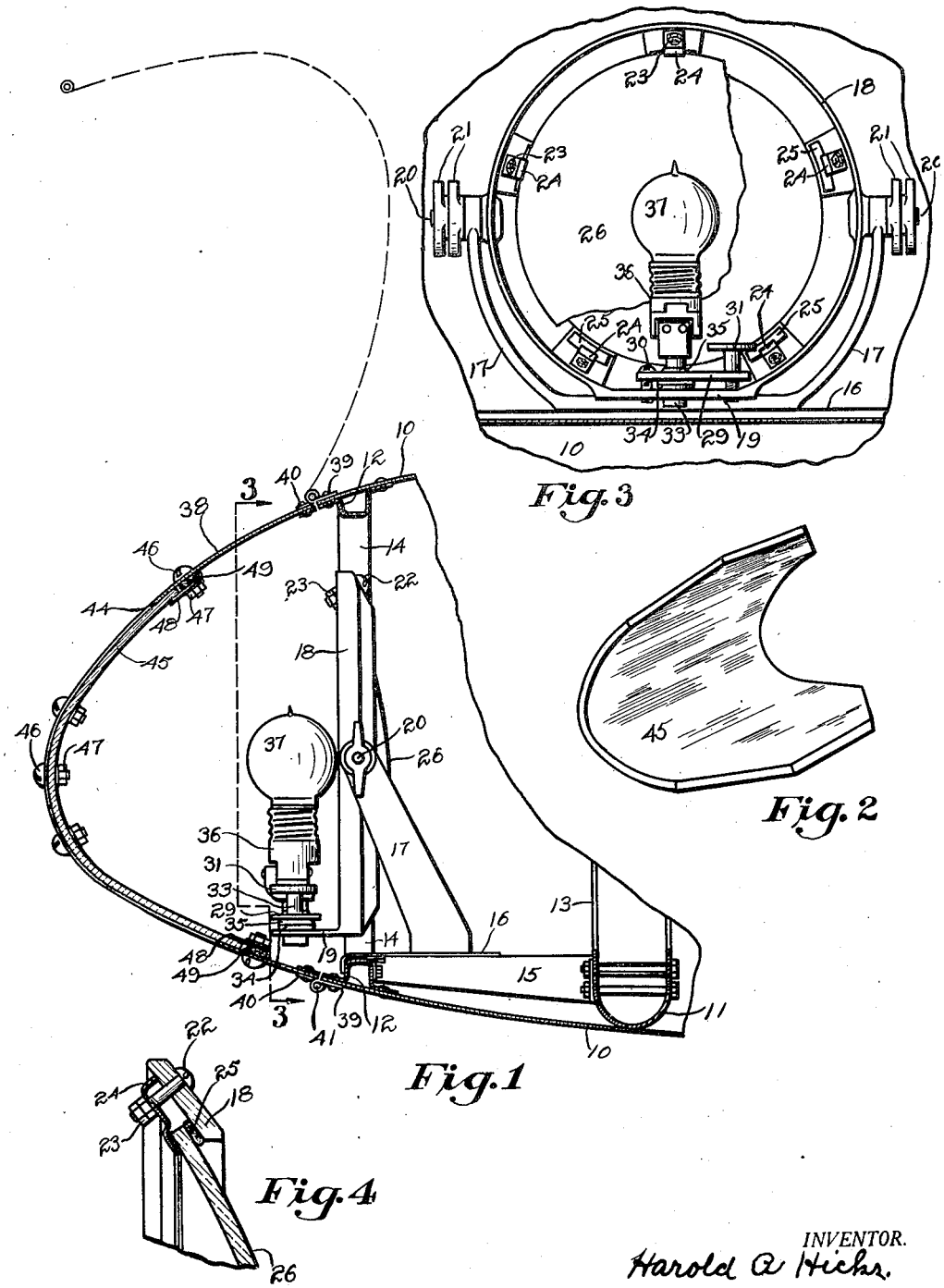

Aug. 13, 1929.   H. A. HICKS   1,724,482
AIRPLANE LANDING LIGHT
Filed Oct. 7, 1927   2 Sheets-Sheet 2

INVENTOR.
Harold A. Hicks.
BY  C. R. Halbert.
E. L. Davis.
ATTORNEYS.

Patented Aug. 13, 1929.

1,724,482

UNITED STATES PATENT OFFICE.

HAROLD A. HICKS, OF DETROIT, MICHIGAN, ASSIGNOR TO FORD MOTOR COMPANY, OF HIGHLAND PARK, MICHIGAN, A CORPORATION OF DELAWARE.

AIRPLANE LANDING LIGHT.

Application filed October 7, 1927. Serial No. 224,589.

The object of my invention is to provide an airplane landing light of simple, durable, and inexpensive construction.

Still a further object of my invention is to provide an airplane landing light which may be so constructed that it will not appreciably increase the wind resistance of an airplane.

Still a further object of my invention is to mount an airplane landing light within the interior of the wing, and to provide a lens for the light which may be set flush with the surface of the wing and stream lined to correspond with the surface of the wing, whereby the appearance or the stream line of the wing is not materially altered by the use of the light and the wind resistance of the airplane is not affected.

Still a further object of my invention is to provide an airplane landing light which may be adjustable to throw the beam to the position which is found most advantageous, and wherein the bulb is adjustable relative to a reflector whereby the character of the beam thrown from the light may be altered.

With these and other objects in view, my invention consists in the arrangement, construction, and combination of the various parts of my improved device, as described in the specification, claimed in the claims, and illustrated in the accompanying drawings, in which:

Figure 1 shows a vertical transverse sectional view through a portion of the airfoil of an airplane wing, which has my improved landing light installed therein.

Figure 2 shows a perspective view of the lens used in connection with my improved landing light.

Figure 3 shows a vertical sectional view taken on the line 3—3 of Figure 1.

Figure 4 shows an enlarged vertical sectional detail view illustrating the manner of attaching the reflector to the reflector frame.

Figure 5:
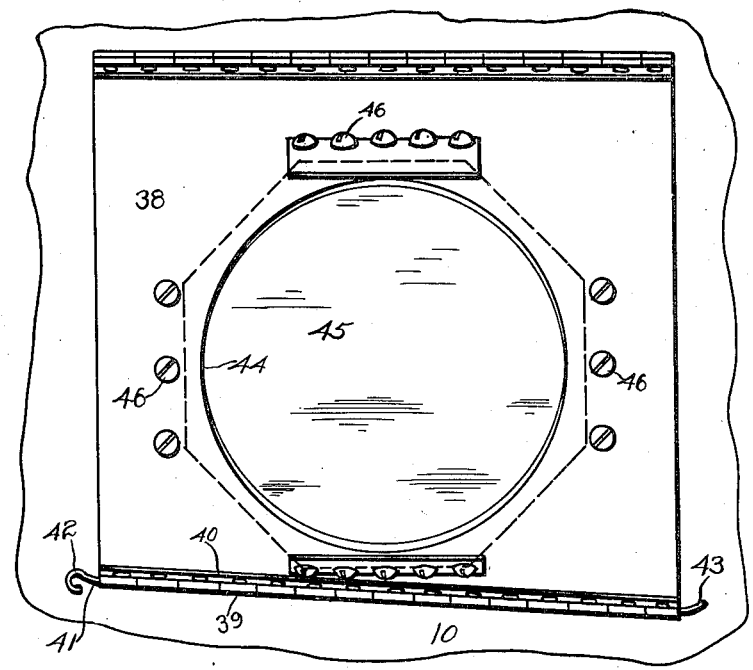
Figure 5 shows a front elevation of a portion of an airplane wing having my improved landing light installed therein.
Figure 6:
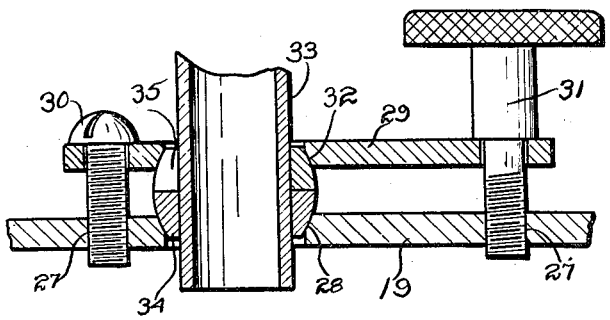
Figure 6 shows an enlarged detail vertical sectional view illustrating the manner of mounting my bulb socket in front of the reflector to permit adjustment of said bulb.

Referring to the accompanying drawings, I have used the reference numeral 10 to indicate generally the skin of a metallic airplane wing having a main longitudinal spar 11 and auxiliary longitudinal spar 12. Vertical struts 13 and 14 connect with these spars 11 and 12. A horizontal strut 15 extends between the main spar 11 and the auxiliary spar 12.

The lower auxiliary spar 12 and the horizontal strut 15 support a plate 16 having a pair of diverging upwardly extending arms 17 thereon. These arms 17 are curved to embrace a reflector and bulb carrying frame having a reflector bezel 18 and an integral horizontal lamp supporting platform 19. Aligned studs 20 project at opposite sides of the bezel 18 through openings in the ends of the arms 17 to pivotally support this bezel and the lamp relative to the plate 16. Pairs of wing nuts 21 are screwed onto each of these studs 20 to permit the adjustment of the reflector relative to the plate 16 and to lock it in its adjusted position.

A plurality of screws 22 extend through the bezel 18 and are provided with nuts 23 whereby clamps 24 may be sprung against the front edges of a reflector 26 to mount this reflector in the bezel 18. Cushion felts 25 may be provided between the bezel 18 and the reflector 26, if desired, to prevent injury to the reflector from impact or vibration. The clamps 24 are formed from resilient material and are of L shape so that when one end butts against the bezel 18 and the other end against the reflector 26 and the screws 22 engage said clamp in between its ends, then that the clamp will resiliently engage the reflector due to its inherent resiliency so that a cushion felt will not be needed between the clamps 24 and the reflector 26.

The lamp supporting platform 19 is provided with a pair of spaced threaded openings 27 and the third opening 28 therebetween which has its upper edge shaped to form a spherical seat. A clamping plate 29 is disposed in position spaced above the platform 19 and is provided with openings therein aligned with the openings 27 and 28. A screw 30 extends through one of the openings in the clamping plate 29 opposite the openings 27 in the platform 19 and serves to prevent movement of the plate 29 at that end away from the platform 19. The position of the clamping plate 29 at the end where the screw 30 is, can be adjusted by screwing the screw 30 into or out of the platform 19. A thumb screw 31 extends through the other opening in the plate 29 opposite the other opening 27 and is threaded into the platform 19. The lamp supporting stem 33 has a ring 34 slidably mounted thereon between the platform 19 and the plate 29. The exterior of this ring 34 is of spherical shape to correspond with the spherical seat 28 in the platform 19. A second and split ring 35 of resilient material is slidably mounted on the stem 33 above the ring 34. This second thread ring 35 has a spherical exterior designed to co-act with a crrrespondingly shaped spherical seat 32 in the central opening in the clamping plate 29.

It will be seen that the thumb screw 31 can be screwed down to swing the clamping plate 29 closer to the platform 19 thereby causing the spherical seats 32 and 28 to engage the exteriors of the rings 34 and 35 so that universal movement of the stem 33 relative to the platform 19 is permitted and the clamp 29 can be made tight enough to hold the stem 33 in any of its adjusted positions by its engagement with the rings 34 and 35. As has heretofore been mentioned, the ring 35 is split and is made of resilient material so that when the plate 29 is clamped down thereon, the spherical exterior of the ring 35 co-acting the spherical seat 32 of the clamping plate 29 will contract a ring 35 onto the stem 33 to prevent axial movement of the stem 33 relative to the rings 34 and 35.

A lamp socket 36 is fixed to the stem 33 in any suitable manner and the lamp 37 is received in this socket 36 in any standard way. From the description of the mounting of the stem 33 it will be seen that the bulb 37 can be moved to any position relative to the reflector 26 to secure any desired adjustment of the beam from said reflector. In other words the vertical position of the bulb 37 can be adjusted by sliding the stem 33 axially through the rings 34 and 35 and the lateral position of the bulb can be adjusted by swinging it on its ball mounting. Loosening the thumb screw 31 will permit the adjustment and tightening it will prevent the lamp from getting out of adjustment.

A rectangular opening is cut into the skin 10 of the airplane wing and the rectangular lens frame 38 is mounted on the wing in position to cover this opening formed in the wing. This lens frame may preferably be made from metal and I have found that the same type of metal may be used for the lens frame that is used for the wing skin when the latter is formed from metal. A piano hinge member 39 is riveted to the skin 10 and into a flange of the auxiliary spars 12 at the top and bottom edges of the opening in the skin. A complementary hinge member 40 is secured to the top and bottom edges of the lens frame 38. It should be mentioned that this lens frame 38 is so shaped that it exactly conforms to the stream lining of the skin of the airplane wing so that there will be substantially no wind resistance set up thereby. The frame is secured to the wing skin by passing pintle wires 41 through the adjacent hinge member 39 to secure the lens frame in place. One of the pintle wires 41 may be provided with a hook 42 and a bent up portion 43 of its opposite ends whereby it may be removed to gain access to the lamp by pulling it out of the hinge members by means of the hook 42 or it may be locked in place by bending it at the bend 43 to prevent its accidental removal or loss. When access is desired to the light, the lower pintle wire 41 can be withdrawn and then the lens frame 38 swung up to the position indicated by dotted lines in Figure 1.

The lens frame 38 is provided with a circular opening 44 designed to receive the lens 45. This lens 45 is formed from glass in the form of device here illustrated, which is cast to have octagonal outline and a cross section corresponding to the stream line section of the wing of the airplane upon which the lamp is installed. This lens 45 is secured in place in the opening 44 by a plurality of screws 46 which have nuts 47 cooperating therewith. These screws are preferably arranged in series and clamps 48 are provided near the top and bottom and both sides of the lens 45 to cooperate with these series of screws 46 to lock the lens 45 into the lens frame 38. A cushion felt 49 may be used if desired to prevent breakage of the lens 45 from vibration or impact against the frame.

In the practical operation of my improved device the parts are installed as has just been described. The position of the lamp 37 relative to the reflector 26 is adjusted to give the desired beam character from the lamp, this adjustment being accomplished by the thumb screw 31. The position of the reflector 26 may then be adjusted by means of the wing nuts 21 to throw the beam from the lamp through the lens 45 in any desired direction. That is to say, the beam can either be raised to give a considerable penetration ahead at some distance, or it can be directed downwardly to a part nearer to the airplane wing.

Among the many advantages arising from the use of my improved airplane landing light, it should first be pointed out that the stream line of the wing of the airplane is substantially unaffected by the installation of my improved landing light. In the next place, this light adds very little additional weight. Still a further advantage results from the fact that the type of beam emanating from the light may be adjusted to meet different landing speeds and conditions. That is the bulb can be adjusted relative to the reflector to give a wide spread of light or a relatively concentrated narrow beam. The beam can be further adjusted to throw forwardly or downwardly from the plane as may be desired. Inspection and repair or replacement of the parts is very simple.

Some changes may be made in the arrangement, and construction of the various parts of my improved device as without departing from the spirit of my invention and it is my intention to cover by my claims such changes as may reasonably be included within the scope thereof.

I claim as my invention:

1. In an airplane landing light, a source of light disposed within the wing, a transparent rigid detachable section of wing skin in front of said source of light, and means for adjusting the direction and quality of the beam from said light source.

2. In an airplane landing light, a source of light disposed in the wing, a transparent rigid detachable section of wing skin in front of said source of light, a reflector mounted in said wing adjacent to said source of light, said reflector being adjustably mounted on said wing, and means for adjustably supporting said source of light on said reflector, whereby the character and direction of the beam emanating from said source of light may be adjusted and whereby the transparent section may be readily removed to repair and adjust the light source and reflector.

3. In an airplane landing light, a wing member having a longitudinal spar therein and an opening in the wing skin adjacent to said spar, a lamp and reflector adjustably mounted on said spar within the lines of the wing, a lens member conforming in section to the airfoil of said wing and adapted to be disposed in said opening, means for mounting said lens in a lens frame, and a piano hinge construction connecting opposite edges of said lens frame with the wing skin surrounding either opening whereby the lens and lens frame may be readily removed or swung to open position by removing the pintle pin for said piano hinge connection.

4. In an airplane landing light, a source of light disposed in the wing, a detachable section of the leading edge of said wing in front of said source of light, a transparent rigid member mounted in said detachable section, and a reflector mounted in the wing rearwardly of said source of light, whereby the reflector and source of light and transparent member may be made accessible by removing said detachable section of said wing.

September 27, 1927.

HAROLD A. HICKS.